Sept. 21, 1965 M. STIMLER 3,207,976

PROGRESSIVE MAGNETIC SATURATION DEVICE

Filed Nov. 8, 1961 2 Sheets-Sheet 1

INVENTOR.
MORTON STIMLER

BY W. O. Quesenberry
[signature] ATTYS.
[signature] AGENT.

PROGRESSIVE MAGNETIC SATURATION DEVICE

Filed Nov. 8, 1961 2 Sheets-Sheet 2

INVENTOR.
MORTON STIMLER
BY W. E. Quesenberry
D. L. Hodges ATTYS.
L. M. Dalgarn AGENT.

United States Patent Office 3,207,976
Patented Sept. 21, 1965

3,207,976
PROGRESSIVE MAGNETIC SATURATION DEVICE

Morton Stimler, Hyattsville, Md., assignor to the United States of America as represented by the Secretary of the Navy Filed Nov. 8, 1961, Ser. No. 151,109
13 Claims. (Cl. 323—56)
(Granted under Title 35, U.S. Code (1952), sec. 266)

The invention described herein may be manufactured and used by or for the Government of the United States of America for governmental purposes without the payment of any royalties thereon or therefor.

This invention relates to a progressive magnetic saturation device and more particularly to a saturable magnetic core which may be progressively saturated along its magnetic axis.

The use of magnetic saturation devices in electronic circuitry has become increasingly more important. Many of the functions formerly performed by vacuum tube and transistor circuits are now being performed by magnetic amplifiers and switching circuits. The present popularity of magnetic circuits over their vacuum tube and transistor counterparts is due mainly to the ease and low cost of construction, reliability under adverse environmental conditions, and low power requirements. However, magnetic saturation devices have been mostly limited in practical application to simple switching functions and power amplification.

An object of this invention is to provide a new and improved magnetic core so configured that the core may be selectively saturated progressively along the length thereof in accordance with a magnetic force applied thereto.

Another object is to selectively vary the effective number of turns of a winding on the core of the device by externally controlling the saturated length of the core.

Another object of the invention is to provide a progressive magnetic saturation delay line, which is simple, inexpensive, and reliable.

A further object of this invention is to provide a progressive magnetic saturation wherein the function generated is determined by the shape of the magnetic core and the input waveform.

Yet another object of the present invention is the provision of a flux or temperature measuring device employing a progressive magnetic saturation core.

A still further object of the invention is to provide a magnetic amplifier employing a progressive magnetic saturation core.

Other objects and advantages will be apparent from the following description of several embodiments of the invention, and the novel features will be particularly pointed out hereinafter in connection with the appended claims.

In the drawings:

FIG. 1 is a schematic illustration of the progressive magnetic saturation device;

FIGS. 2*a* and 2*b* are hysteresis diagrams of the magnetic characteristics of the saturable core;

Figure 1:
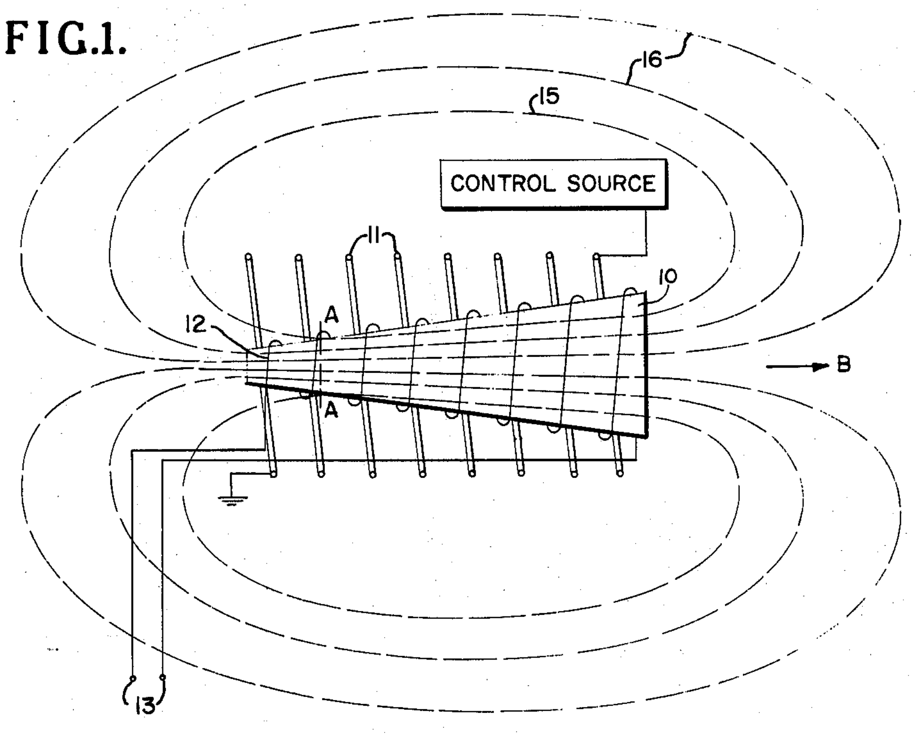

In the illustration of FIG. 1, a saturable magnetic core 10 of conical shape is disposed within a magnetic solenoid coil 11 with its longitudinal axis in coincidence with the longitudinal axis of the solenoid coil. The saturable magnetic core may be composed of any well known magnetically saturable material, such as, iron or the equivalent thereof. A secondary winding 12 is wound on the core 10 in such a way that the coils of the winding have been disposed at different distances along the longitudinal axis of the core, in this case, a constant number of turns per unit of axial length. The leads from the secondary winding are led out of the solenoid to the output terminals 13. In operation, current passing through the coils of the solenoid winding 11 creates a magnetic field, illustrated in the drawing of FIG. 1, by the flux lines 15 and 16. Since the conical shape of the core 10 provides a cross sectional area which varies as a function of position along the axis, and since the magnetic tapered core offers a lower reluctance path than air to the magnetic lines of flux, they will distribute themselves approximately as shown in FIG. 1, and the different cross sections of the core are therefore subjected to different flux densities up to the point of saturation. If the field produced by the solenoid coil 11 is of sufficient strength, a portion of the core 10 will become saturated, and this portion cannot support any appreciable additional flux, and must pass outside the core. Thus a given magnetic field strength produced by the solenoid coil 11 will saturate the smaller end of the core up to a point along its axial length, such as designated in the drawing by the dashed line A—A. The larger portion of the core is of sufficient cross sectional area such that it will support additional flux before becoming saturated. If the current in the coil 11 is increased, a greater magnetic field will result within the solenoid thereby causing the saturation boundary to move axially along the core towards the larger end as a greater portion of the core becomes saturated, thereby changing the quiescent condition.

Now, considering that small external flux signal is impressed upon the partially saturated core, a small time rate of change of flux will be induced thereby within the solenoid about the quiescent field produced by the D.C. current in the solenoid coil 11, and it is obvious that there will be a voltage induced in those turns of the secondary winding which are linked by the flux change. The portion of the core from section A—A to the apex, since it is saturated, will have very little or no flux change corresponding to the small scope of the magnetization curve in the saturation region, within the core or those turns of the secondary winding on that portion, and consequently there will be very little induced voltage in that portion of the winding. The remainder of the core, from section A—A to the base, is not saturated and therefore the flux change will take place within the core, and consequently the turns on this portion of the core will have a voltage induced in them. This induced voltage in the secondary winding will be proportional to the number of turns of the secondary winding 12 through which a change in flux takes place. If the core were totally unsaturated the external signal flux change would take place throughout the whole core and all of the windings of the secondary would be linked therewith. However, with a portion of the core saturated, little or no flux change would take place through the turns of this portion and these turns are effectively uncoupled from the changing flux signal is illustrated in FIG. 1 where only the flux lines 16 necessary for saturation enter the saturated portion of the core and additional flux lines 15 are only able to enter the core in the portions of greater cross sectional area. Therefore the resulting signal appearing at the output terminals 13 will be effectively smaller due to the fact that the number of turns through which the flux change takes place has been reduced.

The saturable magnetic core 10 has been described as conical in shape for the purpose of illustration only. This core may take any shape desired in which there is a progressive change in cross sectional area along a given dimension, such as, logarithmic, hyperbolic or spherical. The effect of a change in field strength in the solenoid coil on the uncoupling of the secondary winding from an external signal will depend upon two factors, the shape of the core and the spacing of the windings along the core dimension. The number of secondary windings uncoupled from a changing external signal by the solenoid field strength change will equal the number of turns of the secondary winding which link a given change in cross sectional area of the core. In the case of the conical shaped core with the windings being distributed evenly along the axial length, the cross sectional area of the core is changing at a rate proportional to the square of the axial distance along the core and thus the windings uncoupled by a given change of field strength will be proportional to the inverse square of this field strength. If a direct relationship is desired between the strength of the solenoid field and the output of the secondary coil, the core may be wedge shaped to present a change in cross sectional area proportional to the change in distance along its axial length or the windings may be so distributed as to present a constant number of windings per unit change of core area cross section.

Figure 2A:
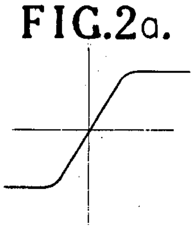

FIG. 2*a* shows a common hysteresis diagram of a saturable magnetic material; the hysteresis loop in this case has a slightly rounded knee as the material approaches saturation. In the ideal case, the unsaturated portion of the hysteresis curve would be a straight line until reaching saturation. The less rounding at the knee of the curve, the more sharp is the boundary between the saturated and the unsaturated state portions of the core. However, a material having a rounded hysteresis curve may also be used in most applications of the progressive saturation device and does not effect substantially the operation of the progressive magnetic saturation device in most applications.

Figure 2B:
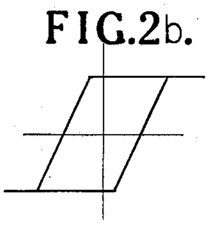

FIG. 2*b* shows the hysteresis loop of the well known square loop hysteresis materials. The squareness of the knee between the saturated and unsaturated states makes these materials especially useful in providing a sharp separation between the saturated and unsaturated portions of the core. However, some of these materials exhibit high degrees of remanence; thus once a portion of the core has been saturated, it is necessary to apply a magnetic field in the opposite direction to remove the saturation from the square loop hysteresis material; this feature limits the use of these materials in many applications.

Figures 3, 5:
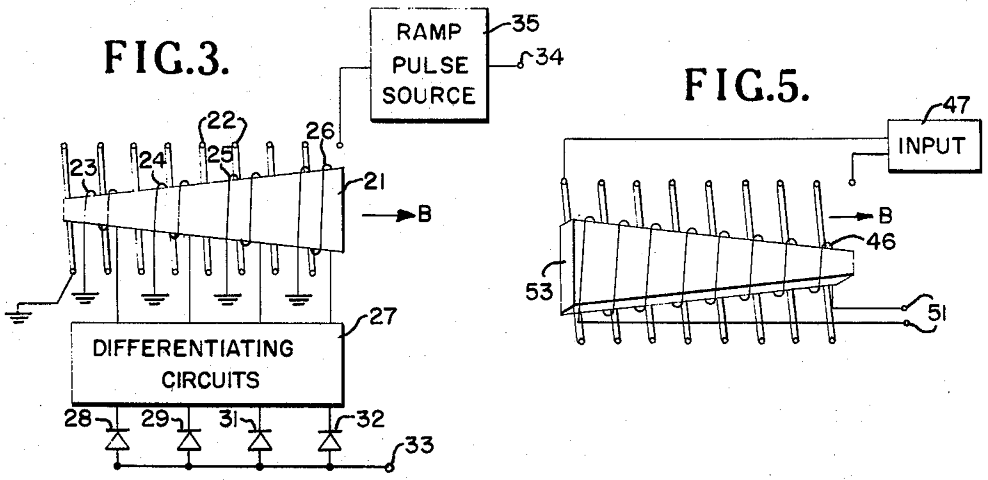
FIG. 3 illustrates an embodiment of the invention in which the progressive magnetic saturation device is employed as a delay line.
FIG. 5 illustrates an embodiment of the invention in which the progressive magnetic saturation device is used as a function generator.

FIG. 3 shows a conical magnetic core 21 disposed within a solenoid coil 22 to be used as a delay line or a delayed pulse producing circuit. A number of secondary windings 23, 24, 25 and 26 are wound upon the core 21 and equally spaced from one another along the axial length of the core. One end of each of the secondary coils is led out of the solenoid to separate differentiating circuits 27. After differentiation, the output from each of the secondary coils passes through its respective diode 28, 29, 31 and 32 to the output terminal 33.

Figure 4:
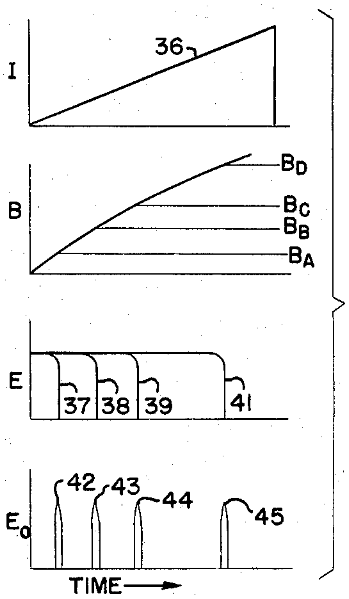
FIG. 4 is a time diagram of the operation of the delay line of FIG. 3.

The operation of the delay circuit of FIG. 3 is best illustrated by reference to the time diagrams of FIG. 4. The pulse to be delayed is received at the input terminal

34 from ramp pulse source 35 which produces a ramp or saw tooth current pulse 36 which is applied to the windings of the solenoid coil 22. The magnetic field within the solenoid coil 22 acting on the conical core 21 also builds up in a ramp fashion in proportion to the input current. At a certain time after the arrival of the input pulse, the ramp pulse source 35 is generating an amount of current through the solenoid coil 22 which is sufficient to saturate that portion of the conical core on which the secondary winding 23 is wound; the saturating flux for this portion of the core is shown in FIG. 4 as the flux value $B_A$. As the ramp pulse 36 continues, the field strength within the solenoid increases thus moving the point of saturation past the secondary winding 24, 25, and 26 in turn; the necessary saturating fluxes at these points are designated $B_B$, $B_C$, and $B_D$ respectively. Each of the separate secondary coils senses a constant flux change in that portion of the core on which it is wound until the magnetic field causes saturation of that portion; at such time there can be no more flux change in that portion of the core. The output from the secondary windings is thus an almost constant voltage until saturation is reached, at which time the voltage output drops off to zero. The output voltage from the secondary coils 23, 24, 25 and 26 drops to substantially zero for each in turn, as shown by curves 37, 38, 39 and 41 respectively on the time diagrams of FIG. 4. When these voltage drops are differentiated by their separate differentiating circuits 27 and rectified voltage pulses appear at the output terminal 33 which are spaced in time. The time spacing of these output pulses 42, 43, 44 and 45 may be regulated by the shape of the core and the axial placement of the secondary windings thereon.

Figure 6:
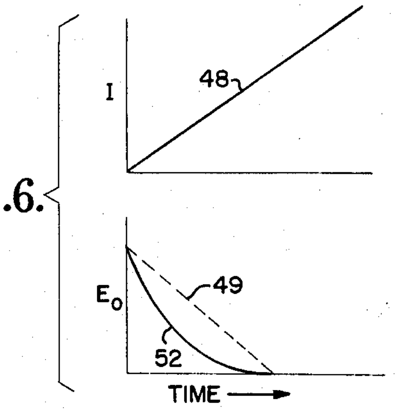
FIG. 6 is a time diagram illustrating the operation of the function generator of FIG. 5.

The almost unlimited number of relations between the input voltage and that from the output winding of the progressive magnetic saturation device which may be accomplished by different shapes of the core and different spacing between the turns of the output winding made the progressive magnetic saturation device particularly useful as a function generator. FIG. 5 illustrates one such relationship which may be established; a multitude of other effects and arrangements will be obvious to any person skilled in the art. In this case the core 53 within the solenoid coil is a wedge shaped core which will give a change in cross sectional area proportional to the change along its longitudinal axis. The secondary winding, however, is wound upon the core so that the turns thereof at the wide end of the core are farther apart than the turns wound on the narrow end of the core; the core is thus wound so that the number of windings for unit axial length increases uniformly from the wide end of the core to the narrow end. As the current to the solenoid coil is increased, the movement of the boundary between saturation and non-saturation will move along the core in a directly proportional manner; however, the number of windings which are becoming uncoupled by the movement of the boundary is taking place at a greater rate as the boundary moves on the smaller end of the core than it will at the larger end of the core where the windings are less densely wound. This operation is illustrated by FIG. 6, which shows a ramp input current pulse applied from the input source 47 to the solenoid coil. If the secondary winding 46 were wound uniformly along the axial length of the core the output pulse appearing at the output terminals 51 of the secondary winding would be a straight line decreasing voltage 49. However, due to the spacing of the windings the output pulse drops more rapidly at the beginning where the windings are more densely packed.

Figure 7:
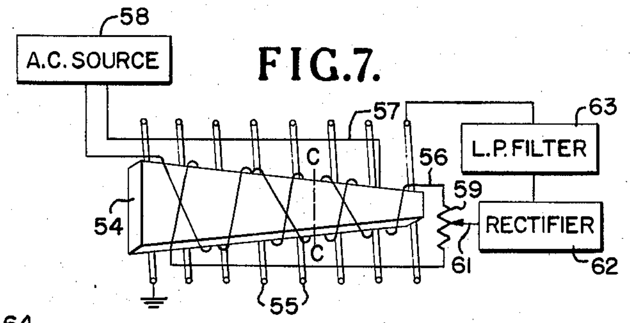
FIG. 7 illustrates an embodiment of the invention using the progressive magnetic saturation device as an automatically controlled transformer.

FIG. 7 illustrates the progressive magnetic saturation device employed as a transformer. In this case a wedge shaped magnetic core is used to provide a linear response between the solenoid field and the secondary windings; as before stated, the core shape and windings may be arranged to provide any desired response. The core 54 is placed within the solenoid coil 55, as before, and a secondary winding 56 is wound thereon. In addition to the secondary winding 56 is a primary winding wound on top of the secondary winding, as is common in transformer and magnetic amplifier applications. The A.C. current supplied to the primary winding 57 by the AC source 58 is applied to the core 54, and the changes of flux therein are sensed by the secondary winding 56 and appear across the output resistor 59. A portion of the output appearing across the output resistor 59 is picked off by the tap 61, rectified by the rectifiers 62, and passed through the low pass filter 63 thereby producing substantially a D.C. voltage from the A.C. output. This D.C. voltage is then fed back to the solenoid coil 55 acting as a control winding to establish a magnetic field therein, which is sufficient to cause saturation of the core along its axial length up to a particular point, such as that shown by the dashed line C—C. The saturation of a portion of the core causes uncoupling between the primary and the secondary windings according to the before mentioned principles, and thus establishes a given turns ratio between primary and secondary. Considering, now, that the amplitude of the A.C. signal in the primary winding 57 were to increase the output on the load resistor 59 would also increase. This increase would be fed back to the rectifier 62 and low pass filter 63 to increase the current flow through the solenoid coil 55. This increase in current through the solenoid coil would cause movement of the saturation boundary C—C further toward the large end of the core thus uncoupling a greater number of the secondary turns from the primary winding. This would result in a decrease in the output across the load resistor 59 thus stabilizing the output voltage. Although the control winding is shown as the external solenoid coil 55 for ease of illustration, the construction is simplified by winding this coil directly on the core.

Figure 8:
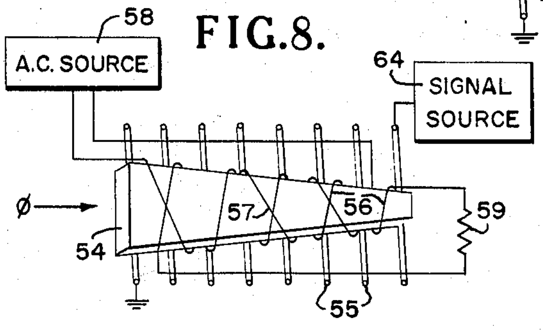
FIG. 8 illustrates a magnetic amplifier employing a progressive magnetic saturation device.

In FIG. 8, the transformer circuit illustrated by FIG. 7 has been modified to provide operation as a magnetic amplifier. The solenoid coil 55 in this case receives its magnifying current from a signal source 64. The degree of saturation of the core 54 will thus depend on the amplitude of the signal supplied to the solenoid coil 55 from the signal source 64, and the coupling between the primary winding 57 and the secondary winding 56 will be changed in accordance with this signal. It is to be understood that the number of turns on the solenoid coil 55, now acting as a control winding, may be increased in relation to the other windings to increase the amplification of the signal. The signal appearing on the output resistor 59 will be controlled by the signal from source 64 and will be in inverse proportion thereto. The A.C. source may be the common 400 cycle source used in many magnetic amplifier applications.

It should be obvious to any person skilled in the art that the basic circuit shown for the magnetic amplifier may be modified in any arrangement now common in the field of magnetic amplifiers. The use of the progressive magnetic saturation core to change the inductance of the primary winding in a non-complementing magnetic amplifier is one such obvious example. Also, the use of a feedback in some manner, such as shown in FIG. 7, may be used as for automatic control of the magnetic amplifier, such as automatic volume control.

A similar arrangement to that shown in FIG. 8 could also be used to measure an already existing magnetic field of strength $\phi$. The external magnetic field $\phi$ could be seen to effect the position of the established saturation boundary and thus change the coupling between the primary and secondary windings. The measurement of the strength of the magnetic field $\phi$ could be accomplished by supplying the solenoid coil 55 with a constant D.C. voltage from the source 64. A carefully regulated A.C. source 58 would also be necessary. The strength of the magnetic field $\phi$ would then be indicated by the difference in output voltage on the load resistor 59 between the condition of zero magnetic field $\phi$, where the boundary C—C is set solely by the constant D.C. source 64, and the condition where $\phi$ has a value sufficient to move the location of the boundary. Also, by completely removing the solenoid, the saturation of the core will be determined solely by the external field $\phi$. This provides a multidirectional field measuring device.

If the material used for the core has a permeability which is sensitive to temperature changes, the magnetic amplifier arrangement may also be used to measure temperature in the surrounding atmosphere. It is obvious that if the permeability of the magnetic core is changed, by any condition, the saturation boundary on the core will change positions when the magnetic field applied thereto is maintained constant. The operator need only provide a meter calibrated to read the output voltage across the output resistance 59 as a temperature.

Figure 9:
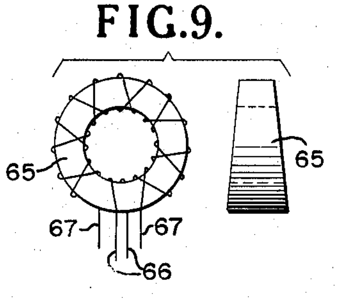
FIG. 9 illustrates an alternative form of the progressive magnetic saturation core.
Figure 10:
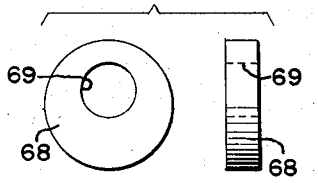
FIG. 10 illustrates still another form of the progressive magnetic saturation core.

FIG. 9 and FIG. 10 represent alternative core shapes which may be applied to the instant invention. The shape of the core in FIG. 9 is toroidal, but exhibits the necessary tapering of cross sectional area about its radius by reason of the wedge shaped construction, as is shown in the side view of the core 65. In using the toroidal shape the secondary winding 66 is wound directly on the core, as before, and the field producing winding 67 is also wound thereon. Fig. 10 shows a toroidal core 68 of flat cross section; however, the tapering radial cross section is obtained by offsetting the center of the hole 69 in the core, as shown.

Figure 11:
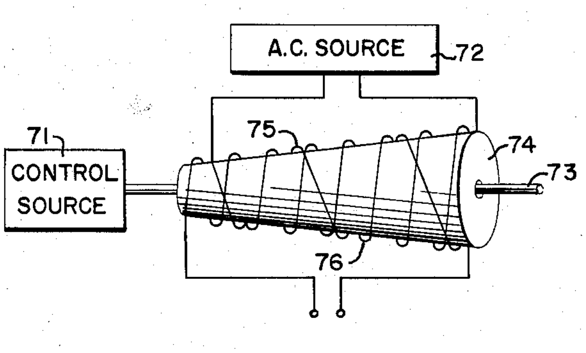
FIG. 11 illustrates a progressive magnetic saturation device in which the progressive magnetic saturation is provided by a conductor disposed along the axis of the core.

In FIG. 11 a large center conductor 73 passes magnitizing current from control source 71 through the center of the conical core 74. The current passed through the center conductor produces a magnetic field encircling the wire, which is effective to progressively saturate the core in a direction around its center axis. The primary winding 75 carrying the A.C. voltage from source 72 and the secondary 76 are wound about the core as before, with the windings distributed along the longitudinal axis of the core. The saturation of a portion of core by a current I through the center conductor 73 acts, as before, to uncouple the portions of the primary from the secondary windings wound thereon.

It will be understood that various changes in the details, materials and arrangements of parts which have been herein described and illustrated in order to explain the nature of the invention, may be made by those skilled in the art within the principle and scope of the invention as expressed in the appended claims.

What is claimed as new and desired to be secured by Letters Patent of the United States is:

1. A progressive magnetic saturation device comprising a saturable magnetic core having a progressively varying cross sectional area along a first dimension, means for establishing a changing first magnetic field in said core sufficient to saturate portions of said core, and secondary winding means wound on said core having portions distributed along substantially the extent of said first dimension, each portion of said secondary winding means being magnetically coupled to sense changes of magnetic field in that portion of said core on which it is wound, whereby changes of said first magnetic field are sensed only by the portions of said secondary winding means which are wound on unsaturated portions of said core.

2. The magnetic saturation device of claim 1 in which said magnetic core is conical in shape and said first dimension is the axis of said conical shape.

3. The progressive magnetic saturation device of claim 1 in which said magnetic core is toroidal in shape, and said first dimension is the circumference of said toroid.

4. The progressive magnetic saturation device of claim 1 in which said core is wedge shaped and of constant thickness, and said first dimension is the longitudinal axis of said wedge shape.

5. A magnetic delay line comprising a saturable magnetic core having a varying cross-sectional area along one of its dimensions, means for applying an increasing magnetic field to said core along said dimension, and an output winding means for sensing the magnetic saturation of the cross-sectional area enclosed thereby and producing a signal thereof, said output winding means being wound on said core at a selected portion of said core having predetermined cross-sectional areas whereby the occurrence of said signal is delayed from commencement of said increasing magnetic field an amount of time proportional to the cross-sectional area of the portion of the core on which said output winding means is wound, said saturable magnetic core having a conical shape.

6. A magnetic function generator comprising a saturable magnetic core having a variable cross sectional area along one of its dimensions, said cross sectional area varying along said dimension according to a first mathematical function, a secondary winding wound on said core, the number of turns of said secondary winding per unit length of said first dimension varying according to a second mathematical function, and an input winding means for applying a magnetic field to said core in the form of an input signal, whereby the voltage induced in said secondary winding by said primary winding means is modified according to said first and second mathematical functions.

7. A magnetic amplifier comprising a saturable magnetic core of varying cross sectional area along one of its dimensions, a primary winding means for applying to said magnetic core an alternating current signal, secondary winding means wound on said core and being distributed along said first dimension, and a control winding means for applying to said core a control signal capable of saturating a portion of said core along said first dimension, whereby the magnetic coupling between said primary and said secondary windings is controlled by said control signal.

8. The magnetic amplifier of claim 7 further comprising an output resistor connected to said secondary winding, feedback means for producing a direct current feedback signal proportional to the output of said secondary winding across said output resistance, said feedback signal comprising the control signal to said control winding, whereby the amplitude of the output signal is automatically controlled.

9. The magnetic amplifier of claim 7 in which said control signal is of a constant D.C. value, and said magnetic core may be partially saturated by an additional external field, whereby said voltage induced in said secondary winding is a measure of said external field.

10. The magnetic amplifier of claim 7 in which the core is composed of a magnetic material, the permeability of which material varies with a change in the surrounding temperature, whereby the voltage induced in said secondary winding is a measure of the said temperature.

11. A progressive magnetic saturation device comprising a saturable magnetic core, means for establishing a magnetic field in said core, said core having different cross sectional areas normal to said field at different portions thereof, and sensing means distributed along substantially the entire length of said core for sensing the magnetic saturation of said portions, said sensing means having an output determined by the magnitude of said magnetic field.

12. The progressive magnetic saturation device of claim 11 wherein said means for establishing a uniform magnetic field comprises a winding wound around said core.

13. The progressive magnetic saturation device of claim 11 wherein said means for establishing a uniform magnetic field comprises a wire coaxial with the center axis of said core.

References Cited by the Examiner

UNITED STATES PATENTS

| | | | |
|---|---|---|---|
| 2,799,822 | 7/57 | De Witz | 336—155 X |
| 2,907,957 | 10/59 | De Witz | 333—29 |
| 2,923,834 | 2/60 | Silverman | 307—88 |

LLOYD McCOLLUM, *Primary Examiner*